US007846878B2

(12) United States Patent
Robb et al.

(10) Patent No.: US 7,846,878 B2

(45) Date of Patent: Dec. 7, 2010

(54) FRICTION REDUCER PERFORMANCE IN WATER CONTAINING MULTIVALENT IONS

(75) Inventors: Ian D. Robb, Lawton, OK (US); Thomas D. Welton, Duncan, OK (US); Jason Bryant, Duncan, OK (US); Michael L Carter, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 12/497,968

(22) Filed: Jul. 6, 2009

(65) Prior Publication Data

US 2009/0298721 A1 Dec. 3, 2009

Related U.S. Application Data

(63) Continuation-in-part of application No. 11/879,423, filed on Jul. 17, 2007, now Pat. No. 7,579,302.

(51) Int. Cl.
*C09K 8/24* (2006.01)
*E21B 43/16* (2006.01)

(52) U.S. Cl. ................ 507/224; 166/305.1; 166/308.1; 166/308.3; 507/225; 507/277

(58) Field of Classification Search ................ 507/224, 507/225, 277; 166/305.1, 308.1, 308.3
See application file for complete search history.

(56) References Cited

U.S. PATENT DOCUMENTS 3,414,053 A 12/1968 Treiber
4,351,950 A 9/1982 Lawson
4,381,950 A 5/1983 Lawson
4,539,122 A 9/1985 Son
4,666,528 A 5/1987 Arrington
4,888,121 A 12/1989 Dill
4,949,790 A 8/1990 Dill
5,160,631 A 11/1992 Frost
5,674,817 A 10/1997 Brezinski
6,506,711 B1 1/2003 Shuchart
6,531,427 B1 3/2003 Shuchart
6,746,611 B2 6/2004 Davidson
6,784,141 B1 8/2004 King
6,787,506 B2 9/2004 Blair
6,987,083 B2 1/2006 Phillippi
7,004,254 B1 2/2006 Chatterji
7,117,943 B2 10/2006 Harris
7,232,793 B1 6/2007 King
7,271,134 B2 6/2007 King
7,579,302 B2 * 8/2009 McMechan et al. ......... 507/225
2005/0194292 A1 9/2005 Beetge
2009/0023617 A1 1/2009 McMechan

OTHER PUBLICATIONS

U.S. Appl. No. 12/151,498, Thompson (filed May 7, 2008).
Halliburton Prod. Optimization, Stimulation, AquaStim Water Frac Services, Adv. Techs. Focused on Improving Prod. from Unconventional Reservoirs, Halliburton, H05291 Jun. 2007.
Ceresa, Pretsch, & Bakker, Direct Potentiometric Inf. on Total Ionic Concentrations, 2000 Am. Chem. Society, Mar. 31, 2000, pp. 2050-2054.
Lauw, Leermakers & Stuart, On the Binding of Calcium Micelles Composed of Carboxy-Modified Pluronics, 2006, Am. Chem. Society, Nov. 2, 2006, pp. 10932-10941.
Oh, Kim, Lee, Rho, Cha & Nam, One-Component Room Temp. Vulcanizing-Type Silicone Rubber-Based Calcium-Selective Electrodes, Anal. Chem., vol. 68, No. 3, Feb. 1, 1996, pp. 503-508.
Thermo Electron Corp., Orion Calcium Electrode Instruction Manual, #274997.001 Rev. E.

* cited by examiner

*Primary Examiner*—Timothy J. Kugel
(74) *Attorney, Agent, or Firm*—Robert A. Kent; Tumey L.L.P.

(57) ABSTRACT

A variety of methods and compositions are disclosed, including, in one embodiment, a method that comprises: introducing a treatment fluid into a subterranean formation, wherein the treatment fluid comprises water and a concentrated polymer composition comprising a complexing agent and a friction reducing polymer. Also disclosed is a method that comprises combining at least water and a concentrated polymer composition to form a treatment fluid, wherein the concentrated polymer composition comprises a complexing agent and a friction reducing polymer; and introducing the treatment fluid into a subterranean formation. Also disclosed is a concentrated polymer composition comprising: a friction reducing polymer in an amount of about 15% to about 60% by weight of the composition; and a complexing agent.

20 Claims, 3 Drawing Sheets

Test No. 11
Test No. 10
Test No. 8
Test No. 7
Test No. 9
Time-Averaged % Friction Reduction
Time (minutes)
-20
-10
0
10
20
30
40
50
60
70
80
90
100
0
2
4
6
8
10
12
14
16
18
20
22
24
26
28

FRICTION REDUCER PERFORMANCE IN WATER CONTAINING MULTIVALENT IONS

CROSS REFERENCE TO RELATED APPLICATIONS

This application is a continuation in part of U.S. patent application Ser. No. 11/879,423, now U.S. Pat. No. 7,579,302, filed on Jul. 17, 2007, entitled "Improving Friction Reducer Performance by Chelating Multivalent Ions in Water," the entire disclosure of which is incorporated herein by reference.

BACKGROUND

The present invention relates to friction reducing polymers, and more particularly, to the use of complexing agents to improve the performance of friction reducing polymers in water containing multivalent ions.

During the drilling, completion and stimulation of subterranean wells, treatment fluids are often pumped through tubular structures (e.g., pipes, coiled tubing, etc.). A considerable amount of energy may be lost due to turbulence in the treatment fluid. As a result of these energy losses, additional horsepower may be necessary to achieve the desired treatment. To reduce these energy losses, certain polymers (referred to herein as "friction reducing polymers") have been included in these treatment fluids. In general, friction reducing polymers are high molecular weight polymers, such as those having a molecular weight of at least about 2,500,000. Typically, friction reducing polymers may be linear and flexible (e.g., persistence length <10 nm). One example of a suitable friction reducing polymer is a polymer comprising acrylamide and acrylic acid.

An example of a stimulation operation that may utilize friction reducing polymers is hydraulic fracturing. Hydraulic fracturing is a process commonly used to increase the flow of desirable fluids, such as oil and gas, from a portion of a subterranean formation. In hydraulic fracturing, a fracturing fluid may be introduced into the subterranean formation at or above a pressure sufficient to create or enhance one or more fractures in the formation. Enhancing a fracture may include enlarging a pre-existing fracture in the formation. To reduce frictional energy losses within the fracturing fluid, friction reducing polymers may be included in the fracturing fluid. One type of hydraulic fracturing treatment that may utilize friction reducing polymers is commonly referred to as "high rate water fracturing" or "slick water fracturing." As will be appreciated by those of ordinary skill in the art, fracturing fluids used in these high rate water fracturing systems are generally not gels. As used in this disclosure, the term "gel" refers to an interconnected assembly of macromolecules having temporary or permanent cross links and exhibiting an apparent yield point. As such, in high rate water fracturing, velocity rather than the fluid viscosity is relied on for proppant transport. Additionally, while fluids used in high rate water fracturing may contain a friction reducing polymer, the friction reducing polymer is generally included in the fracturing fluid in an amount sufficient to provide the desired friction reduction without gel formation. Gel formation would cause an undesirable increase in fluid viscosity that would, in return, result in increased horsepower requirements.

SUMMARY

The present invention relates to friction reducing polymers, and more particularly, to the use of complexing agents to improve the performance of friction reducing polymers in water containing multivalent ions.

An embodiment of the present invention provides a method that comprises: introducing a treatment fluid into a subterranean formation, wherein the treatment fluid comprises water and a concentrated polymer comprising a complexing agent and a friction reducing polymer.

Another embodiment of the present invention provides a method that comprises: combining at least water and a concentrated polymer composition to form a treatment fluid, wherein the concentrated polymer composition comprises a complexing agent and a friction reducing polymer; and introducing the treatment fluid into a subterranean formation.

Another embodiment of the present invention provides a concentrated polymer composition comprising: a friction reducing polymer in an amount of about 15% to about 60% by weight of the composition; and a complexing agent.

The features and advantages of the present invention will be apparent to those skilled in the art upon reading the following description of specific embodiments.

BRIEF DESCRIPTION OF THE DRAWINGS

These drawings illustrate certain aspects of some of the embodiments of the present invention, and should not be used to limit or define the invention.

DESCRIPTION OF SPECIFIC EMBODIMENTS

Figure 1:
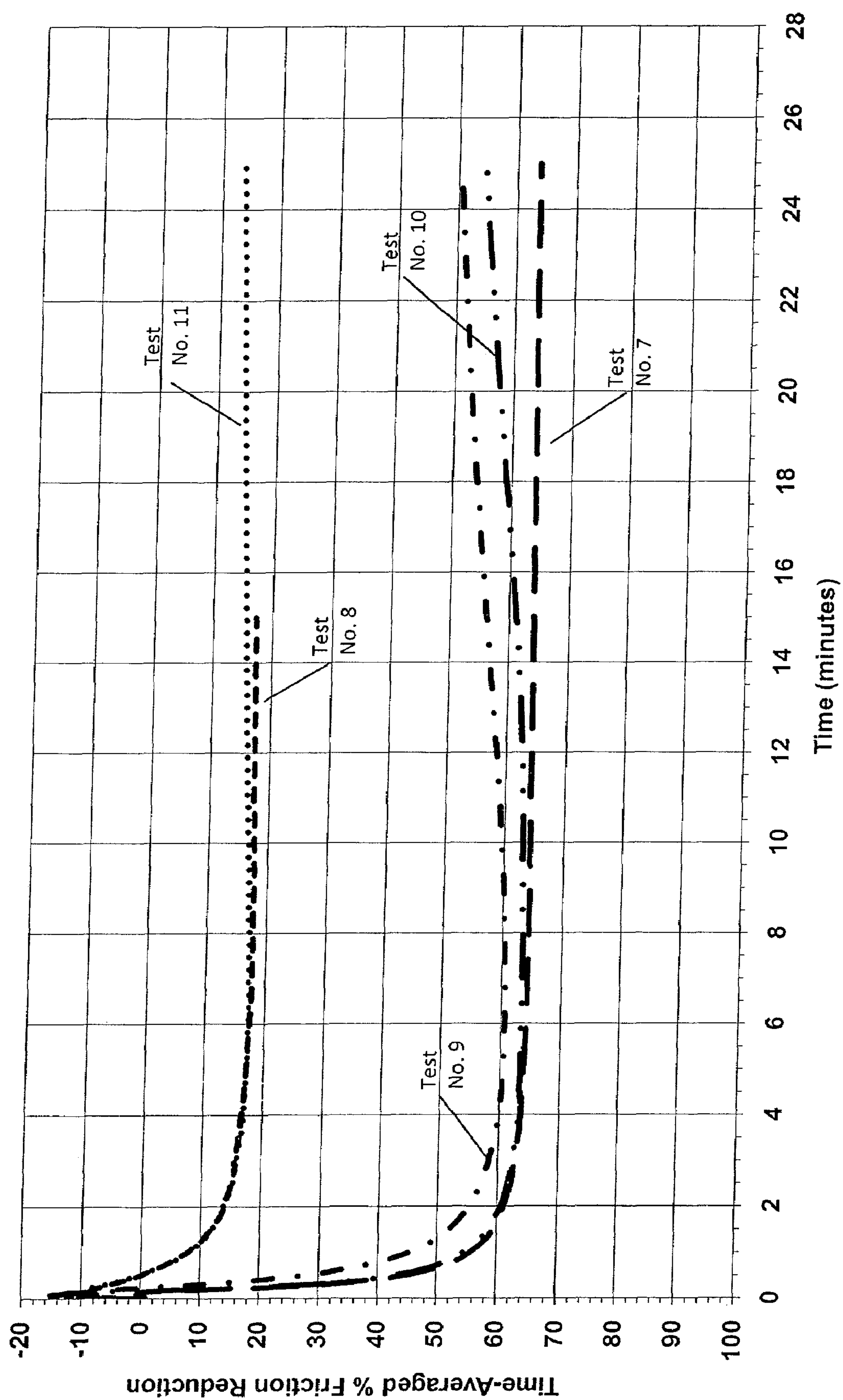
FIG. 1 is a graph showing percent friction reduction versus time for various sample fluids.

The present invention relates to friction reducing polymers, and more particularly, to the use of complexing agents to improve the performance of friction reducing polymers in water containing multivalent ions. While these methods may be suitable for use in a variety of subterranean treatments where friction reduction may be desired, they may be particularly useful in high rate water fracturing.

The treatment fluids prepared in accordance with embodiments of the present invention generally comprise water, a friction reducing polymer, and a complexing agent. The water generally contains multivalent ions. As previously discussed, treatment fluids are commonly prepared by adding one or more friction reducing polymers to water. The friction reducing polymers are included in the fluids to reduce energy losses due to turbulence within the treatment fluid. Those of ordinary skill in the art will appreciate that the source of water used to prepare the treatment fluids may contain multivalent ions. However, if water is used that contains a sufficient concentration of multivalent ions, the multivalent ions may undesirably interact with the friction reducing polymers so as to reduce the effectiveness of the friction reducing polymers. Accordingly, to counteract these interactions between the friction reducing polymers and the multivalent ions, higher concentrations of the friction reducing polymers can be included in the treatment fluids. However, the use of one or more complexing agents to control the multivalent ions in the water can improve the performance of the friction reducing polymers. Accordingly, by use of one or more complexing agents, reduced amounts of the friction reducing polymers may be used to achieve the desired friction reduction in water containing multivalent ions.

The source of water used to prepare the treatment fluids in accordance with embodiments of the present invention generally comprises multivalent ions, for example, calcium ions, magnesium ions, iron ions, aluminum ions, barium ions and combinations thereof. The water may also comprise monovalent ions, such as sodium and potassium ions. In accordance with certain embodiments, the source of the water may include pond water or produced water that comprises multivalent ions. As will be appreciated by those of ordinary skill in the art, these sources of water may be utilized where alternative sources of water that are generally free of multivalent ions are unavailable. Multivalent ions also may be present where brines, such as sodium chloride brines or potassium chloride brines are used. Moreover, as previously mentioned, multivalent ions present in certain concentrations may undesirably interact with the friction reducing polymers to reduce the polymers' effectiveness for reducing friction. By way of example, the present technique may be suitable for use where the presence of the multivalent ions exhibits a measurable effect on the polymers effectiveness for reducing friction. The presence of the multivalent ions may become increasingly undesirable as the concentration exceeds about 1 millimole per liter.

As noted above, the treatment fluids in accordance with certain embodiments of the present invention comprise a friction reducing polymer. Suitable friction reducing polymers should reduce energy losses due to turbulence within the treatment fluid. Those of ordinary skill in the art will appreciate that the friction reducing polymer(s) included in the treatment fluid should have a molecular weight sufficient to provide a desired level of friction reduction. In general, polymers having higher molecular weights may be needed to provide a desirable level of friction reduction. By way of example, the average molecular weight of suitable friction reducing polymers may be at least about 2,500,000, as determined using intrinsic viscosities. In certain embodiments, the average molecular weight of suitable friction reducing polymers may be in the range of from about 7,500,000 to about 20,000,000. Those of ordinary skill in the art will recognize that friction reducing polymers having molecular weights outside the listed range may still provide some degree of friction reduction.

A wide variety of friction reducing polymers may be suitable for use with the present technique. In certain embodiments, the friction reducing polymer may be a synthetic polymer. Additionally, for example, the friction reducing polymer may be an anionic polymer or a cationic polymer, in accordance with embodiments of the present invention. By way of example, suitable synthetic polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof.

One example of a suitable anionic friction reducing polymer is a polymer comprising acrylamide and acrylic acid. The acrylamide and acrylic acid may be present in the polymer in any suitable concentration. An example of a suitable anionic friction reducing polymer may comprise acrylamide in an amount in the range of from about 5% to about 95% and acrylic acid in an amount in the range of from about 5% to about 95%. Another example of a suitable anionic friction reducing polymer may comprise acrylamide in an amount in the range of from about 60% to about 90% by weight and acrylic acid in an amount in the range of from about 10% to about 40% by weight. Another example of a suitable anionic friction reducing polymer may comprise acrylamide in an amount in the range of from about 80% to about 90% by weight and acrylic acid in an amount in the range of from about 10% to about 20% by weight. Yet another example of a suitable anionic friction reducing polymer may comprise acrylamide in an amount of about 85% by weight and acrylic acid in an amount of about 15% by weight. As previously mentioned, one or more additional monomers may be included in the anionic friction reducing polymer comprising acrylamide and acrylic acid. By way of example, the additional monomer(s) may be present in the anionic friction reducing polymer in an amount up to about 20% by weight of the polymer.

Suitable friction reducing polymers may be in an acid form or in a salt form. As will be appreciated, a variety of salts may be prepared, for example, by neutralizing the acid form of the acrylic acid monomer or the 2-acrylamido-2-methylpropane sulfonic acid monomer. In addition, the acid form of the polymer may be neutralized by ions present in the treatment fluid. Indeed, as used herein, the term "polymer" is intended to refer to the acid form of the friction reducing polymer, as well as its various salts.

As will be appreciated, the friction reducing polymers suitable for use in the present technique may be prepared by any suitable technique. For example, the anionic friction reducing polymer comprising acrylamide and acrylic acid may be prepared through polymerization of acrylamide and acrylic acid or through hydrolysis of polyacrylamide (e.g., partially hydrolyzed polyacrylamide).

In addition, the friction reducing polymers suitable for use in embodiments of the present invention may be used in any suitable form. By way of example, the friction reducing polymers may be provided as emulsion polymers, solution polymers or in dry form. In certain embodiments, the friction reducing polymer may be provided in a concentrated polymer composition that comprises the friction reducing polymer. As used herein, the term "concentrated polymer composition" refers to a composition comprising the friction reducing polymer in a more concentrated form than in the final treatment fluid that will be used in the subterranean treatment. By way of example, the concentrated polymer composition may comprise the friction reducing polymer in an amount in the range of about 5% to about 100% by weight of the composition, alternatively, in an amount in the range of about 15% to about 60% by weight of the composition, and, alternatively, in an amount in the range of about 25% to about 45% by weight of composition. In some embodiments, the concentrated polymer composition may comprise an oil external emulsion that comprises the friction reducing polymer dispersed in the continuous hydrocarbon phase (e.g., hydrocarbon solvents, etc.). An example of a suitable oil external emulsion that comprises a polymer of acrylamide and acrylic acid dispersed in the continuous phase is available from Halliburton Energy Services, Inc., under the name FR-56™ friction reducer. In some embodiments, concentrated polymer composition may comprise the friction reducing polymers dispersed in an aqueous continuous phase at high concentrations. An example of friction reducing polymer dispersed in an aqueous continuous phase is available from Halliburton Energy Services, Inc., under the name FR-46™ friction reducer. One of ordinary skill in the art will be able to select an appropriate form for the friction reducing polymer for a particular application based on a number of factors, including handling, ease of dissolution to a dilute polymer system, cost, performance and environmental factors, among others.

The friction reducing polymer should be included in the treatment fluids, for example, in an amount equal to or less than 0.2% by weight of the water present in the treatment fluid. In some embodiments, the friction reducing polymers may be included in embodiments of the treatment fluids in an amount sufficient to reduce friction without gel formation upon mixing. By way of example, the treatment fluid comprising the friction reducing polymer may not exhibit an apparent yield point. While the addition of an friction reducing polymer may minimally increase the viscosity of the treatment fluids, the polymers are generally not included in the treatment fluids of the present invention in an amount sufficient to substantially increase the viscosity. For example, if proppant is included in the treatments fluids, velocity rather than fluid viscosity generally may be relied on for proppant transport. In some embodiments, the friction reducing polymer may be present in an amount in the range of from about 0.01% to about 0.15% by weight of the treatment fluid. In some embodiments, the friction reducing polymer may be present in an amount in the range of from about 0.025% to about 0.1% by weight of the treatment fluid.

As previously described, the inclusion of the friction reducing polymers in the example treatment fluids should reduce the energy lost due to turbulence in the water. For example, the addition of the friction reducing polymer may reduce the pressure drop experienced by the water when traveling through a tubular structure (such as a pipe, coiled tubing, etc.) As will be appreciated, the pressure drop for water traveling through a pipe with a circular cross section may calculated with the following equation:

$$\Delta P_{water} = \frac{\rho V^2 L f}{2 g_c d} \quad (1)$$

wherein $\Delta P_{water}$ is the calculated pressure drop for the water, $\rho$ is density, V is the velocity of the water, L is pipe length, $g_c$ is the gravitational constant and d is the pipe diameter. The variable f may be calculated in accordance with the formula below for turbulent flow.

$$f = \left\{-2\log\left[\frac{\varepsilon/d}{3.7} - \frac{5.02}{N_{Re}}\log\left(\frac{\varepsilon/d}{3.7} + \frac{14.5}{N_{Re}}\right)\right]\right\}^{-2} \quad (2)$$

wherein $\epsilon$ is pipe roughness, d is the pipe diameter and $N_{Re}$ is the Reynold's Number (Shacham, M., *Isr. Chem. Eng.,* 8, 7E (1976)). Accordingly, a measured pressure drop of the water traveling at a velocity V through a pipe of length L and diameter d after the addition of the friction reducing polymer may be compared to the calculated pressure drop for the water without the friction reducing polymer to determine a % Friction Reduction ("% FR") using the following equation:

$$\%\ FR = 1 - \frac{\Delta P_{measured}}{\Delta P_{water}} \quad (3)$$

In general, a % FR of greater than 50% may be achieved with the addition of certain of the friction reducing polymers described above (such as the polymers comprising acrylamide) to water. As used herein, unless otherwise noted, the % FR is a ten minute average friction reduction for a pipe length L of 8 ft, a pipe diameter d of 0.554 inches, a pump rate of 8.25 gpm (+/−0.4 gpm), and a pipe roughness $\epsilon$ of $1\times10^{-6}$ inches. Those of ordinary skill in the art will appreciate that the velocity V and Reynold's Number $N_{Re}$ can be readily calculated from these variables.

However, as previously discussed, the multivalent ions contained in the water used to prepare the treatment fluids in accordance with embodiments of the present invention may undesirably interact with the friction reducing polymers. For example, the multivalent ions may reduce the effectiveness of the friction reducing polymers. However, the use of one or more complexing agents to control the multivalent ions in the water can improve the performance of the friction reducing polymers. In accordance with one embodiment, one or more complexing agents may be added to the water containing multivalent ions. By forming complexes with the multivalent ions, the performance of the friction reducing polymers may be improved, for example, by preventing (and/or reducing) the undesirable interactions between the multivalent ions and the friction reducing polymers. However, it has recently been discovered that adding the complexing agent to the concentrated polymer composition rather than to the water may reduce the amount of the complexing agent needed to improve performance of the friction reducing polymers. By way of example, one or more complexing agents may be added to a concentrated polymer composition that comprises a friction reducing polymer dispersed in a hydrocarbon continuous phase. It is believed that addition of the complexing agent(s) to the concentrated polymer composition—rather than to the water—may reduce the amount of the complexing agent required to achieve high friction reduction by a factor of 100 or more. It is surprising that adding the inorganic complexing agent to the oil continuous phase, where it is insoluble, results in much improved friction reducer performance, in accordance with embodiments of the present invention.

Embodiments of the present technique may provide a % FR of greater than 50% (and even greater than 60%) when using certain friction reducing polymers (such as the polymers comprising acrylamide) in water having a calcium ion concentration of greater than 1 millimole per liter. For instance, when added to the water, the complexing agents may reduce the calcium ion concentration from greater than about 10 millimoles to less than about 3.5 millimoles and even to less than 1 millimole, such that the performance of the friction reducing polymer may be improved.

When added to the concentrated polymer composition, the complexing agent may be added in an amount effective to improve the performance of the friction reducing polymer in water containing multivalent ions. By way of example, the complexing agent may be added in a mole ratio of the complexing agent to the anionic monomer of the polymer in the range of about 10:1 to about 1:7, alternatively, in the range of about of about 5:1 to about 1:4, and alternatively, in the range of about 3:1 to about 1:2. By way of further example, the complexing agent may be added in an amount of about 1 pound of complexing agent to about 1 pound of the friction reducing polymer (dry weight of the polymer), alternatively, in an amount of about 1 pound of complexing agent to about 10 pounds of the friction reducing polymer, and alternatively in an amount of 1 pound of complexing agent to 15 pounds of the friction reducing polymer.

When added to the water containing the multivalent ions, the complexing agent may be added to the water in an amount sufficient to provide the desired complexing with the multivalent ions. By way of example, the complexing agent may be included in an amount of from about 50% to about 200% of the normality of the multivalent ion (e.g., calcium ion) concentration in the water. In one embodiment, the complexing agent may be included at equinormality to the multivalent ion concentration. Those of ordinary skill in the art should be able to determine the concentration of the complexing agent to add to the water based on, among other things, the multivalent ions present and the particular complexing agent used.

The complexing agents useful in certain embodiments of the present invention may be any of a variety of complexing agents suitable for controlling the multivalent ions so as to improve performance of the friction reducing polymers. For the embodiments where the complexing agent may be added directly to the water, a complexing agent suitable for use with the present technique should reduce calcium ion concentration below about 4.2 millimoles per liter of the water, when added at equal normality to an approximately 0.15% by weight aqueous solution of calcium chloride by weight. Examples of suitable complexing agents include carbonates, phosphates, pyrophosphates, orthophosphates, citric acid, gluconic acid, glucoheptanoic acid, ethylenediaminetetraacetic acid ("EDTA"), nitrilotriacetic acid ("NTA") and combinations thereof. As will be appreciated, salts of certain complexing agents may also be suitable. By way of example, the sodium salt of EDTA, the sodium salt of NTA, and the sodium salt of citric acid may be suitable complexing agents. Examples of suitable phosphates include sodium phosphates. Examples of suitable carbonates include sodium carbonate and potassium carbonate. Those of ordinary skill in the art should appreciate that the specific complexing agents listed are merely examples, and that the present technique is applicable to other complexing agents suitable that could provide the above-listed calcium ion reduction. As will be appreciated, certain of the suitable complexing agents may have been used previously as scale inhibitors. Scale inhibitors, however, are typically not used in a manner that would control the multivalent ions in the water to improve friction reducer performance. For instance, scale inhibitors are generally used in a low dose to control or prevent scale deposition.

Additional additives may be included in the treatment fluids used in example embodiments of the present technique as deemed appropriate by one of ordinary skill in the art, with the benefit of this disclosure. Examples of such additives include corrosion inhibitors, proppant, gravel (such as in gravel-packing methods), fluid loss control additives, surfactants and combinations thereof. In fracturing embodiments, proppant may be included in the treatment fluids to prevent the fracture from completely closing when the hydraulic pressure is released.

Generally, the treatment fluids are not relying on viscosity for proppant transport. Where particulates (e.g., gravel, proppant, etc.) are included in the aqueous treatments fluids, the fluids rely on at least velocity to transport the particulates to the desired location in the formation. In some embodiments, the treatment fluids may have a viscosity up to about 10 centipoise ("cP"). In some embodiments, the treatment fluids may have a viscosity in the range of from about 0.7 cP to about 10 cP. For the purposes of this disclosure, viscosities are measured at room temperature using a Fann® Model 35 viscometer at 300 rpm with a ⅕ spring.

The treatment fluids useful in accordance with embodiments of the present invention should typically have a pH that does not undesirably interact with the performance of the friction reducing polymers. By way of example, the treatment fluids may have a pH in the range of from about 4 to about 10. Those of ordinary skill in the art will recognize that treatment fluids having a pH outside the listed range may be suitable for certain applications.

As will be appreciated, the treatment fluids comprising the water (with the multivalent ions), the friction reducing polymer and the complexing agent may be used in any suitable subterranean treatment where friction reduction is desired. Such subterranean treatments may include, but are not limited to, drilling operations, stimulation treatments (e.g., fracturing treatments, acidizing treatments, fracture acidizing treatments) and completion operations. In the fracturing embodiments, the treatment fluid may be introduced into a subterranean formation at or above a rate sufficient to create or enhance at least one fracture in the subterranean formation. The compositions and methods of the present invention may be especially useful in high-rate water fracturing treatments. Those of ordinary skill in the art, with the benefit of this disclosure, will be able to recognize a suitable subterranean treatment where friction reduction may be desired.

An example method of the present invention is a method of improving performance of a friction reducing polymer in subterranean treatments. The example method includes adding one or more complexing agents to water comprising multivalent ions. The example method further includes adding one or more friction reducing polymers to the water comprising the multivalent ions to form a treatment fluid. The example method further includes introducing the treatment fluid into a subterranean formation. As will be appreciated, the complexing agent may be added to the water prior to, or in combination with, the addition of the friction reducing polymers. In one embodiment, the friction reducing polymer and/or the complexing agent may be added to the water on the fly. As used herein, the term "on the fly" refers to the introduction of one flowing stream into another flowing stream so that the two streams combine and mix while flowing together as a single stream. For example, the friction reducing polymer may be introduced into the water containing the multivalent ions while the water is being introduced into a well bore.

As previously described, during introduction of the treatment fluid into the subterranean formation, energy may be lost due to turbulence in the water. However, the addition of the friction reducing polymer to the water should reduce these energy losses. For example, the addition of the friction reducing polymer may reduce the pressure drop experienced by the water when traveling through a tubular structure. As previously described, however, the multivalent ions present in the water may undesirably interact with the friction reducing polymer, thereby reducing their effectiveness. Accordingly, as also previously described, the complexing agents added to the water should complex with at least a portion of the multivalent ions present in the water such that the friction reducing polymers' reduction of energy losses is improved.

Another example method of the present invention for improving performance of a friction reducing polymer in subterranean treatments includes adding one or more complexing agents to a concentrated polymer composition that comprises a friction reducing polymer. By way of example, the concentrated polymer composition may be an oil external emulsion that comprises the friction reducing polymer dispersed in a hydrocarbon continuous phase. As previously described, the concentrated polymer composition contains the friction reducing polymer in a more concentrated form than in the final treatment fluid that will be used in the subterranean treatment. For example, the concentrated polymer composition may comprise the friction reducing polymer in an amount of about 5% to about 100% by weight of the composition. The example method further may include preparing a treatment fluid comprising water, the complexing agent, and the concentrated polymer composition. For example, the concentrated polymer composition with the added complexing agent may be combined with water to form the treatment fluid. The example method further may include introducing the treatment fluid into a subterranean formation. In certain embodiments, the treatment fluid may be introduced into the subterranean formation at or above a pressure sufficient to create or enhance one or more fractures in the subterranean formation.

As previously described, during the introduction of the treatment fluid into the subterranean formation, energy may be lost due to turbulence in the water. However, the addition of the friction reducing polymer to the concentrated polymer composition should reduce these energy losses. For example, the addition of the friction reducing polymer may reduce the pressure drop experienced by the treatment fluid when traveling through a tubular structure. As previously described, however, the multivalent ions present in the water may undesirably interact with the friction reducing polymer, thereby reducing their effectiveness. Accordingly, as also previously described, the complexing agents added to the concentrated polymer composition should improve performance of the friction reducing polymer in the subterranean treatment. It is surprising that adding the inorganic complexing agent to the oil continuous phase, where it is insoluble, results in much improved friction reducer performance, in accordance with one embodiment of the present invention. Moreover, addition of the complexing agent directly to the concentrated polymer composition rather than to the water containing the multivalent ions may reduce the amount of the complexing agent needed to improve performance of the friction reducing polymer. As illustrated below in Example 3, a multivalent cation's effect on the polymer's friction reduction properties may be reduced or even eliminated by a non-precipitating quantity of complexing agent during the duration of desired performance.

To facilitate a better understanding of the present technique, the following examples of some specific embodiments are given. In no way should the following examples be read to limit, or to define, the scope of the invention.

Example 1

Calcium concentration tests were performed to determine the ability of certain additives to control calcium ions in water. As will be appreciated, calcium concentrations in solution can be measured by electrodes in an analogous way to the measurement of acid concentrations by pH electrodes. One major electrode manufacturer, Orion, produces such calcium electrodes that are used in conjunction with a standard appropriate pH meters. Measurement of calcium concentrations with calcium electrodes are described in Lauw, Y. et al., *On the Binding of Calcium by Micelles Composed of Carboxy-Modified Pluronics Measured by Means of Differential Potentiometric Titration and Modeled with a Self-Consistent-Field Theory,* 22(26) Langmuir, 10932-10941 (2006); A. Cersaa & E. Pretcsch, *Direct Potentiometric Information on Total Ionic Concentrations,* 72(9) Anal. Chem. 2050-2054 (2000); and Oh, B. K. et al., *One-Component Room Temperature Vulcanizing-Type Silicone Rubber-Based Calcium-Selective Electrodes;* 68(3) Anal. Chem., 503-508 (1996).

The concentrations of calcium in various aqueous solutions were measured using the Orion 97-20 electrode as specified by the manufacturer. The Orion 97-20 calcium electrode was calibrated using solutions of calcium chloride of $10^{-4}$, $10^{-3}$ and $10^{-2}$ molar concentrations; in addition solutions of 0.15% calcium chloride (corresponding to 0.0135 mol/l $Ca^{++}$ and a typical hard water calcium concentration) were used as starting systems to study the effect of various additives, such as carbonate ions. The calcium electrode is usually read as a millivolt output that has a slope of about 26-27 mV per decade of calcium concentration in the range of about $10^{-5}$ to $10^{-2}$ mol/l when working correctly. Readings were taken after about 2 minutes when they were stable. The temperature was ambient.

The procedure for testing the various additives was as follows: The calcium electrode was calibrated against the standard solutions of $10^{-4}$, $10^{-3}$ and $10^{-2}$ mol/l calcium chloride solutions; the electrode was then placed in 100 mls of 0.15% $CaCl_2$ solution and the millivolt reading (0 to −1 mV) taken. An appropriate amount of the additive (to give equal normality of solution to the calcium chloride) was then added to the solution with stirring until it had completely dissolved. The electrode millivolt reading was then taken again. Readings were reproducible to ±1 mV.

A table of electrode readings of the 0.15% calcium chloride solution with various additives at equal normality is given below in Table 1. The lower calcium concentrations give a more negative millivolt reading.

TABLE 1

Calcium Concentration Tests

| Additive | Calcium electrode reading ±1 mV | Free (Uncomplexed) Ca++ concentration mol/l |
|---|---|---|
| Sodium Carbonate | −40 | $4.4 \times 10^{-4}$ |
| Sodium Citrate | −17 | $3.1 \times 10^{-3}$ |
| Sodium Chloride | −2 | $1.35 \times 10^{-2}$ |
| Sodium Bicarbonate | −7 | $7.5 \times 10^{-3}$ |
| No additive | 0 | $1.35 \times 10^{-2}$ |

Accordingly, from Table 1, it should be noted that some additives complex more effectively with calcium than others. Those giving more than −10 mV electrode reading starting with the 0.15% $CaCl_2$ solution and adding an equinormal amount of the additive are significantly better than those where the change in electrode reading is less than −10 mV.

Example 2

A series of friction reduction tests were performed to determine the effect of the additives from Example 1 on the performance of anionic friction reducing polymers in water containing multivalent ions. In each of the tests, 0.5 gallon of FR-56™ friction reducer per 1,000 gallons of deionized water was used. As previously mentioned FR-56™ friction reducer is an oil external emulsion that contains a copolymer of acrylamide and acrylic acid dispersed in the continuous phase. Calcium chloride in an amount of 0.15% by weight was included in the tap water in Test Nos. 1-5 of Table 2. Test No. 6 was a control that did not include calcium chloride to determine the friction reduction achieved by FR-56™ friction reducer in the absence of multivalent ions. In addition, one of the additives from Example 1 was included in the tap water in Test Nos. 2-6 of Table 2. The particular additive is provided below in Table 2.

These friction reduction tests were performed using a Friction Reduction Meter ("FR Meter") in accordance with the procedure listed below. The FR Meter was a closed loop pipeline apparatus designed to measure the pressure drop across an 8-foot section of a 13-foot Hastelloy pipe. The Hastelloy pipe had an inner diameter of 0.554 inches with a wall roughness of $1\times10^{-6}$ inches. The FR Meter included a storage/mixing tank connected to a fixed speed progressive cavity pump which pumped the test fluid through a magnetic flow meter then through the test pipes and a return line to the storage/mixing tank.

For each test, about 10 liters of deionized water were added to the storage/mixing tank. The pump was run to circulate the water for an amount of time sufficient to fill all the pipes with water. Next, for Test Nos. 1-5, the calcium chloride was added to the storage/mixing tank with mixing by circulating until it had completely dissolved. For Test Nos. 2-5, an appropriate amount of the additive listed below in Table 2 (to give equal normality of solution to the calcium chloride) was then added to the storage/mixing tank with mixing by circulating until it had completely dissolved. For Test No. 6, 0.15% by weight of sodium chloride was added to the storage/mixing tank with mixing by circulating until it had completely dissolved. The data acquisition system was started, and the pump was started after about an additional 10 to 15 seconds. The data acquisition system measured the flow rate, tank temperature and pressure drop across the 8-foot section of pipe. At about 1 minute into the test, 0.5 gallon of FR-56™ friction reducer was added to the storage/mixing tank. Each test was run for a total of about 20 minutes, with flow rate, tank temperature and pressure drop across the 8-foot section of pipe recorded at one-second intervals. The pump rate was about 30 liters per minute, or 3 system volumes per minute. For the commercial steel pipe, the flow was fully turbulent at a Reynolds Number of about 50,000.

The first minute of data that was collected prior to the addition of FR-56™ friction reducer was used to verify instrument readings and provide a baseline of data with a known fluid. The pressure drop across the 8-foot section of pipe for the deionized water containing calcium chloride and/or additives prior to the addition of the friction reducer, was calculated from the flow rate and pipe dimensions in accordance with the following formula:

$$\Delta P_{water} = \frac{\rho V^2 Lf}{2g_c d}$$

wherein $\Delta P_{water}$ is the calculated pressure drop for the deionized water, ρ is density, V is the velocity, L is length, $g_c$ is the gravitational constant and d is the pipe diameter. The variable f was calculated in accordance with the formula below for turbulent flow.

$$f = \left\{-2\log\left[\frac{\varepsilon/d}{3.7} - \frac{5.02}{N_{Re}}\log\left(\frac{\varepsilon/d}{3.7} + \frac{14.5}{N_{Re}}\right)\right]\right\}^{-2}$$

wherein ϵ is pipe roughness, d is the pipe diameter and $N_{Re}$ is the Reynold's Number (Shacham, M., *Isr. Chem. Eng.,* 8, 7E (1976)).

Following the addition of FR-56™ friction reducer to the tank, the measured, ten minute average pressure drop was compared to the calculated pressure drop for the water to determine the Ten Minute Average % Friction Reduction ("% FR") using the following equation:

$$\%\ FR = 1 - \frac{\Delta P_{measured}}{\Delta P_{water}}$$

wherein $\Delta P_{water}$ is the calculated pressure drop for the water and $\Delta P_{measured}$ is the measured, ten minute average pressure drop after introduction of the oil-external emulsion polymer.

The results of the friction reduction tests are shown in Table 2 below. The start time for these measurements was when the FR-56™ friction reducer was added to the storage/mixing tank. To illustrate the relationship between the calcium concentration and the friction reduction, the results of the calcium concentration tests are also provided on Table 2.

TABLE 2

Friction Reduction Tests

| Test | Aqueous-Base Fluid | FR56 Friction Reducer (gal/M gal) | Additive | 10-min Avg % FR | Free (Uncomplexed) Ca++ concentration mol/l |
|---|---|---|---|---|---|
| 1. | 0.15% $CaCl_2$ | 0.5 | — | 45.4 | $1.35 \times 10^{-2}$ |
| 2. | 0.15% $CaCl_2$ | 0.5 | Sodium Chloride | 47.3 | $1.35 \times 10^{-2}$ |
| 3. | 0.15% $CaCl_2$ | 0.5 | Sodium Bicarbonate | 47.5 | $7.5 \times 10^{-3}$ |
| 4. | 0.15% $CaCl_2$ | 0.5 | Sodium Citrate | 58.4 | $3.1 \times 10^{-3}$ |
| 5. | 0.15% $CaCl_2$ | 0.5 | Sodium Carbonate | 65.0 | $4.4 \times 10^{-4}$ |
| 6. | Water | 0.5 | Sodium Chloride | 63.6 | — |

Accordingly, from these friction reduction tests, it should be noted that the compounds (such as the sodium citrate and the sodium carbonate) that complex more effectively with the calcium ions improve the performance of the anionic friction reducing polymer in water containing multivalent ions. For instance, Test Nos. 4 and 5, which used a 0.15% by weight calcium chloride base fluid, provided comparable friction reduction to Test No. 6 that was performed in the absence of multivalent ions.

Example 3

A series of friction reduction tests were performed to determine the effect of adding complexing agents to a concentrated polymer composition on the performance of anionic friction reducing polymers in water containing multivalent ions. In each of the tests, 1 gallon of FR-56™ friction reducer per 1,000 gallons of brine or freshwater was used. As previously mentioned, FR-56™ friction reducer is an oil external emulsion that contains a copolymer of acrylamide and acrylic acid dispersed in the continuous phase.

Test No. 7 included 1 gallon of FR-56™ friction reducer per 1,000 gallons of freshwater. For this test, no calcium chloride or complexing agent was used.

Test No. 8 included 1 gallon of FR-56™ friction reducer per 1,000 gallons of brine. The brine used in this test was a 20-liter solution of calcium chloride in an amount of 10% by weight in deionized water.

Test No. 9 included 1 gallon of FR-56™ friction reducer per 1,000 gallons of brine. The brine used in this test was a 20-liter solution of calcium chloride in an amount of 10% by weight in deionized water. For this test, sodium carbonate was added to the FR-56™ friction reducer in an amount of 15% by weight, before the friction reducer product was injected into the brine. The friction reducer containing sodium carbonate was injected into the 20-liter calcium chloride brine flowing in the friction loop.

Test No. 10 included 1 gallon of FR-56™ friction reducer per 1,000 gallons of brine. Nineteen liters of a calcium chloride brine was prepared in the friction loop, and the FR-56™ friction reducer was hydrated in 1 liter of freshwater using a Waring blender at 1500 rpm for 15 minutes. The hydrated friction reducer in freshwater was added to the 19-liter calcium chloride brine flowing in the friction loop. The final solution containing the friction reducer and brine comprised a 20-liter solution of calcium chloride in an amount of 10% by weight in deionized water and FR-56™ friction reducer in an amount of 1 gallon of per 1,000 gallons of brine.

Test No. 11 included 1 gallon of FR-56™ friction reducer per 1,000 gallons of brine. The brine used in this test was a 20-liter solution of calcium chloride in an amount of 10% by weight in deionized water. For this test prior to the addition of FR-56™ friction reducer, sodium carbonate in an amount of 1.25 pounds per thousand gallons of brine was added and allowed to dissolve in the brine.

These friction reduction tests were performed using a Friction Reduction Meter ("FR Meter") in accordance with the procedure listed below. The FR Meter was a closed loop pipeline apparatus designed to measure the pressure drop across an 8-foot section of a 13-foot Hastelloy pipe. The Hastelloy pipe had an inner diameter of 0.554 inches with a wall roughness of $1\times10^{-6}$ inches. The FR Meter included a storage/mixing tank connected to a variable speed progressive cavity pump that pumped the test fluid through a magnetic flow meter then through the test pipe and a return line to the storage/mixing tank.

For each test, about 20 liters of water were added to the storage/mixing tank. The capacity of the FR Meter used in Example 3 was larger than the 10 liter capacity of the FR Meter used in Example 2. Despite the different capacities of these 2 FR Meters, comparable results were obtained. The pump was run to circulate the water for an amount of time sufficient to fill all the pipes with water. Next, for Test Nos. 8-11, the calcium chloride was added to the storage/mixing tank with mixing by circulating until it had completely dissolved. For Test No 11, the sodium carbonate was then added to the storage/mixing tank with mixing by circulating until it had completely dissolved. The data acquisition system was started, and the pump was started after about 12 seconds. The data acquisition system measured the flow rate, tank temperature and pressure drop across the 8-foot section of pipe. At about 1.2 minutes into the test, 1 gallon of FR-56™ friction reducer was added to the storage/mixing tank. Each test was run for a total of at least 16 minutes, with the flow rate, tank temperature and pressure drop across the 8-foot section of pipe recorded at one-second intervals. The pump rate was about 9 to 10 gallons per minute. For the test pipe, the flow was fully turbulent at a Reynolds Number of about 60,000.

The first 1.2 minutes of data that was collected prior to the addition of FR-56™ friction reducer was used to verify instrument readings and provide a baseline of data with a known fluid. The pressure drop across the 8-foot section of pipe for freshwater was calculated from the flow rate and pipe dimensions in accordance with the following formula:

$$\Delta P_{water} = \frac{\rho V^2 L f}{2 g_c d}$$

wherein $\Delta P_{water}$ is the calculated pressure drop for the freshwater, ρ is density, V is the velocity, L is length, $g_c$ is the gravitational constant and d is the pipe diameter. The variable f was calculated in accordance with the formula below for turbulent flow.

$$f = \left\{-2\log\left[\frac{\varepsilon/d}{3.7} - \frac{5.02}{N_{Re}}\log\left(\frac{\varepsilon/d}{3.7} + \frac{14.5}{N_{Re}}\right)\right]\right\}^{-2}$$

wherein ϵ is pipe roughness, d is the pipe diameter and $N_{Re}$ is the Reynold's Number (Shacham, M., *Isr. Chem. Eng.*, 8, 7E (1976)).

The measured pressure drop of the brine, with or without the friction reducer, was compared to the calculated pressure drop for the freshwater to determine the % Friction Reduction ("% FR") using the following equation:

$$\%\ FR = 1 - \frac{\Delta P_{measured}}{\Delta P_{water}}$$

wherein $\Delta P_{water}$ is the calculated pressure drop for the water and $\Delta P_{measured}$ is the measured, ten minute average pressure drop after introduction of the oil-external emulsion polymer.

The results of the friction reduction tests are shown in FIG. 1. The start time for these measurements was when the FR-56™ friction reducer was added to the storage/mixing tank. As illustrated by Test No. 7 in FIG. 1, FR-56™ friction reducer in freshwater quickly approached about 65% FR and maintained this level throughout the test. In this particular flow regime 65% FR is about the highest level of friction reduction attainable by FR-56™ friction reducer. However, the performance of FR-56™ friction reducer suffers in water containing calcium ions. As illustrated by Test No. 8 in FIG. 1, the performance of the FR-56™ friction reducer is greatly reduced in water containing 10% calcium chloride where the maximum friction reduction achieved was about 20% FR. By adding 15% by weight sodium carbonate to the FR-56™ friction reducer, the performance of the FR-56™ friction reducer is improved. As illustrated by Test No. 9 in FIG. 1, the addition of the sodium carbonate directly to the friction reducer allowed the friction reducer to achieve about 65% FR for several minutes. The friction reduction achieved by addition of the sodium carbonate to the friction reducer product nearly achieves the friction reduction of Test No. 10 where the friction reducer was pre-hydrated in freshwater prior to adding to the brine. As illustrated by Test No. 10 in FIG. 1, pre-hydration of the FR-56™ friction reducer resulted in about 65% for several minutes. As illustrated by Test No. 11 in FIG. 1, treatment of the water—rather than the friction reducer—with an equivalent amount of sodium carbonate did not improve performance of the friction reducer.

Accordingly, from these friction reduction tests, it should be noted that treatment of an oil-external emulsion containing an anionic friction reducing polymer with a complexing agent prior to combination with the water containing calcium ions resulted in improved performance of the anionic friction reducing polymer. In addition, treatment of the water with an equivalent amount of the complexing agent prior to combination with the oil-external emulsion did not improve performance of the anionic friction reducing polymer.

Example 4

Figure 2:
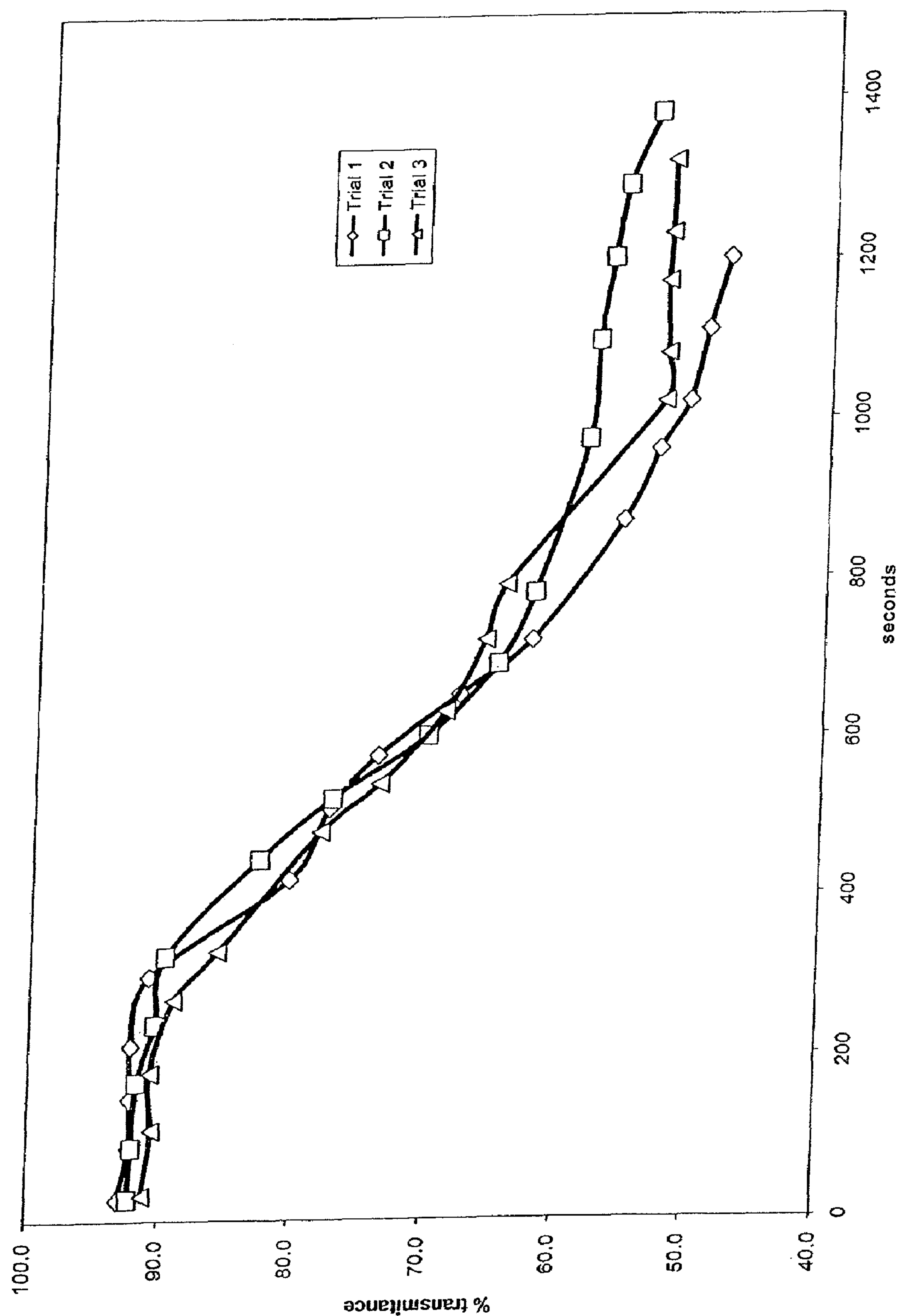
FIGS. 2 and 3 are graphs showing percent transmittance versus time for addition of sodium chloride to 10 weight percent solution of calcium chloride in deionized water.
Figure 3:
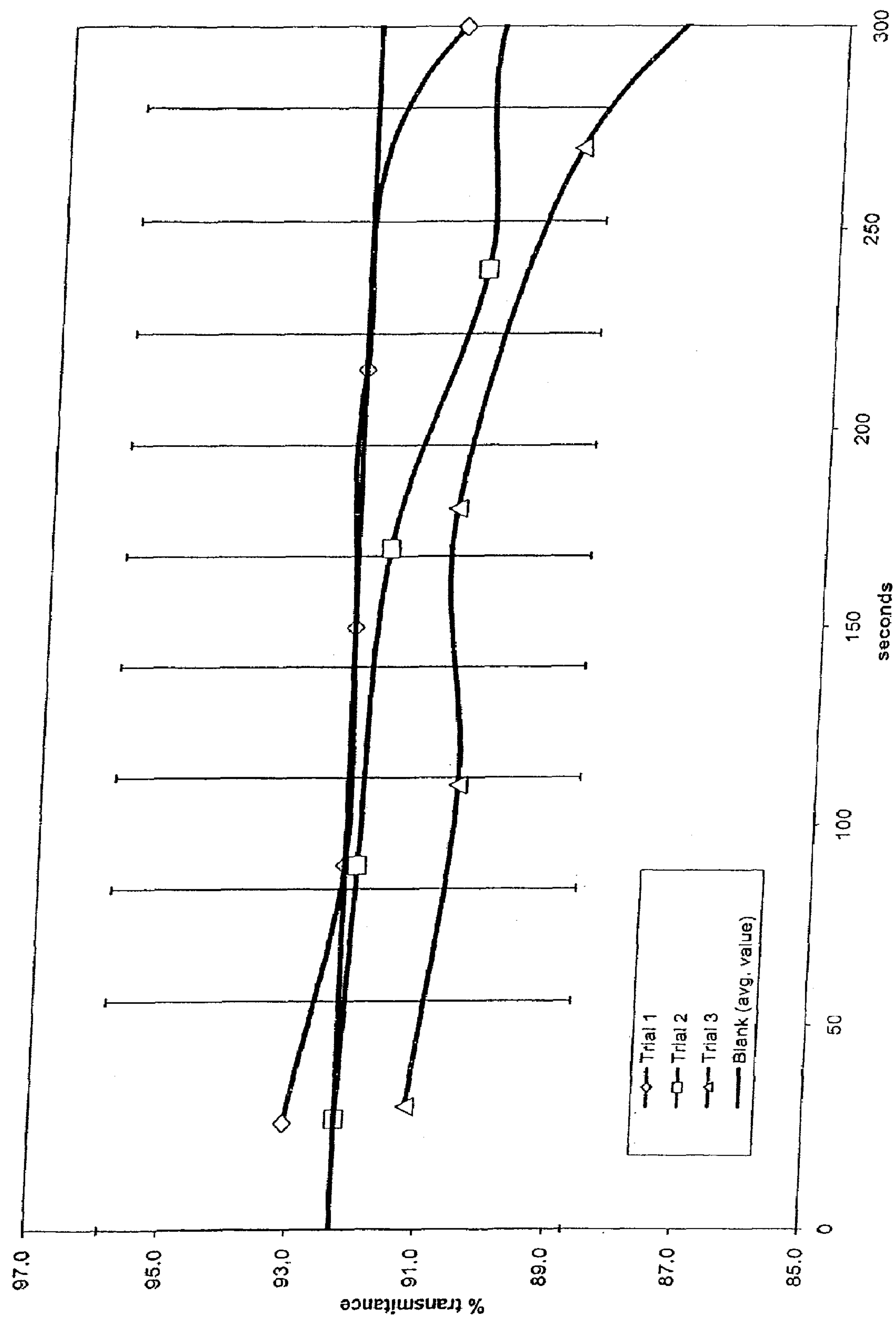

Transmittance tests were performed to determine precipitation when sodium carbonate is added to water containing calcium ions. A 10 weight percent solution of calcium chloride was made in deionized water. The percent transmittance (% T) at 860 nm was measured giving an average value of 92.3% (standard deviation of 3.6%). Next, 1.25 lb/Mgal of sodium carbonate were added to a 10 weight percent solution of calcium chloride that was made in deionized water and the % T was recorded with time. This experiment was conducted in triplicate. The results are given in FIGS. 2 and 3. Looking at FIG. 3, it is readily apparent that % T was within the experimental error of the baseline (92.3%) reading for about the first five minutes of the experiment. Accordingly, it can be concluded that during this time period there was no appreciable precipitation, such as calcium carbonate.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method comprising:

providing a concentrated polymer composition comprising a complexing agent and a friction reducing polymer;

preparing a treatment fluid by a process comprising combining at least water and the concentrated polymer composition; and introducing the treatment fluid into a subterranean formation.

2. The method of claim 1 wherein the friction reducing polymer comprises an anionic friction reducing polymer.

3. The method of claim 2:

wherein the anionic friction reducing polymer comprises at least one monomer selected from the group consisting of acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid ester, methacrylic acid ester, and combinations thereof; and wherein the complexing agent comprises at least one complexing agent selected from the group consisting of a carbonate, a phosphate, a pyrophosphate, an orthophosphate, citric acid, gluconic acid, glucoheptanoic acid, ethylenediaminetetraacetic, and combinations thereof.

4. The method of claim 1:

wherein the concentrated polymer composition comprises an oil external emulsion comprising the friction reducing polymer dispersed in a hydrocarbon continuous phase that comprises the complexing agent;

wherein the friction reducing polymer comprises an anionic friction reducing polymer;

wherein the anionic friction reducing polymer is present in the concentrated polymer composition in an amount of about 25% to about 45% by weight of the composition;

wherein the anionic friction reducing polymer is present in the treatment fluid in an amount equal to or less than about 0.2% by weight of the water present in the treatment fluid;

wherein the anionic friction reducing polymer comprises an anionic monomer;

wherein the complexing agent is present in the concentrated polymer composition in a mole ratio of the complexing agent to the anionic monomer of the anionic friction reducing polymer in the range of about 10:1 to about 1:7;

wherein the treatment fluid has a viscosity in the range of about 0.7 cP to about 10 cP; and wherein the treatment fluid is introduced into the subterranean formation at or above a pressure sufficient to create or enhance at least one fracture in the subterranean formation.

5. The method of claim 4:

wherein the anionic friction reducing polymer is a polymer comprising acrylamide and acrylic acid; and wherein the complexing agent comprises a carbonate.

6. The method of claim 1 wherein the concentrated polymer composition comprises an oil external emulsion comprising the friction reducing polymer dispersed in a hydrocarbon continuous phase that comprises the complexing agent.

7. The method of claim 1 wherein the friction reducing polymer is present in the concentrated polymer composition in an amount in the range of about 5% to about 100% by weight of the composition, and wherein the friction reducing polymer is present in the treatment fluid in an amount equal to or less than 0.2% by weight of the treatment fluid.

8. The method of claim 1 wherein the friction reducing polymer has a molecular weight of at least about 2,500,000 as determined using intrinsic viscosities.

9. The method of claim 1 wherein the complexing agent comprises a carbonate.

10. The method of claim 1 wherein the treatment fluid is characterized by a percent friction reduction of greater than 50% when a calcium ion concentration in the treatment fluid is greater than 1 millimole per liter.

11. The method of claim 1 wherein the friction reducing polymer is an anionic friction reducing polymer that comprises an anionic monomer, and wherein the complexing agent is present in the concentrated polymer composition in a mole ratio of the complexing agent to the anionic monomer of the anionic friction reducing polymer in the range of about 10:1 to about 1:7.

12. The method of claim 1 wherein the treatment fluid has a viscosity in the range of about 0.7 cP to about 10 cP.

13. The method of claim 1 wherein the treatment fluid is introduced into the subterranean formation at or above a pressure sufficient to create or enhance at least one fracture in the subterranean formation.

14. A method comprising:

combining at least water and a concentrated polymer composition to form a treatment fluid, wherein the concentrated polymer composition comprises a friction reducing polymer and a complexing agent; and introducing the treatment fluid into a subterranean formation.

15. The method of claim 14 wherein the friction reducing polymer is present in the concentrated polymer composition in an amount in the range of about 5% to about 100% by weight of the composition, and wherein the friction reducing polymer is present in the treatment fluid in an amount equal to or less than 0.2% by weight of the treatment fluid.

16. The method of claim 14:

wherein the friction reducing polymer comprises at least one monomer selected from the group consisting of acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid ester, methacrylic acid ester, and combinations thereof; and wherein the complexing agent comprises at least one complexing agent selected from the group consisting of a carbonate, a phosphate, a pyrophosphate, an orthophosphate, citric acid, gluconic acid, glucoheptanoic acid, ethylenediaminetetraacetic, and combinations thereof.

17. The method of claim 14 wherein the complexing agent comprises a carbonate.

18. The method of claim 14 wherein the friction reducing polymer comprises an anionic monomer, and wherein the complexing agent is added to the concentrated polymer composition in a mole ratio of the complexing agent to the anionic monomer of the friction reducing polymer in the range of about 10:1 to about 1:7.

19. The method of claim 14 wherein the treatment fluid is introduced into the subterranean formation at or above a pressure sufficient to create or enhance at least one fracture in the subterranean formation.

20. A concentrated polymer composition comprising:

a friction reducing polymer in an amount of about 15% to about 60% by weight of the composition; and a complexing agent.

* * * * *